United States Patent [19]

Austin

[11] Patent Number: 6,009,655
[45] Date of Patent: Jan. 4, 2000

[54] ARM STABILIZER APPARATUS

[76] Inventor: Ronald G. Austin, 313 MacDougall Rd., Fulton, N.Y. 13069

[21] Appl. No.: 09/048,814

[22] Filed: Mar. 26, 1998

Related U.S. Application Data

[60] Provisional application No. 60/043,449, Apr. 9, 1997.

[51] Int. Cl.$^7$ .................................................. F41A 27/30
[52] U.S. Cl. .................................................................. 42/94
[58] Field of Search ..................................................... 42/94

[56] References Cited

U.S. PATENT DOCUMENTS

| | | | |
|---|---|---|---|
| 454,300 | 6/1891 | Sproul | 42/94 |
| 664,979 | 1/1901 | Taylor | 42/94 |
| 759,593 | 5/1904 | Cover | 42/94 |
| 805,189 | 11/1905 | Dubert | 42/94 |
| 889,658 | 6/1908 | Burnach, Jr. | 42/94 |
| 1,288,684 | 12/1918 | Roe | 42/94 |
| 3,200,528 | 8/1965 | Christensen | 42/94 |
| 5,784,820 | 7/1998 | Wood | 42/94 |

FOREIGN PATENT DOCUMENTS

| | | | |
|---|---|---|---|
| 15996 | 7/1897 | United Kingdom | 42/94 |

*Primary Examiner*—Charles T. Jordan
*Assistant Examiner*—Denise Buckley

[57] ABSTRACT

An arm stabilizer apparatus is attachable to a belt and includes a base assembly which includes belt connectors for connecting the base assembly to the belt. A hinge is connected to the base assembly, and an adjustable-length arm stabilizer assembly is connected to the hinge. The apparatus can be used in three modes: an in-use orientation; one non-use orientation in which the apparatus is oriented above the belt; and another non-use orientation in which the apparatus is oriented below the belt. The in-use orientation is adjustable, and the apparatus returns to an adjusted in-use orientation from a previous non-use orientation. In the in-use orientation, the apparatus is oriented in an arm-reception orientation, whereby a portion of a person's upper arm can be supported by the adjustable-length arm stabilizer assembly for aiming a weapon, such as a rifle or bow. An adjustable-length arm stabilizer assembly is pivotally connected to the hinge pin. The adjustable-length arm stabilizer assembly includes a telescopic strut assembly pivotally connected to the hinge. A strut orientation control assembly, connected between the adjustable-length arm stabilizer assembly and the belt, returns the adjustable-length arm stabilizer assembly to a previously adjusted in-use orientation from a non-use orientation.

11 Claims, 3 Drawing Sheets

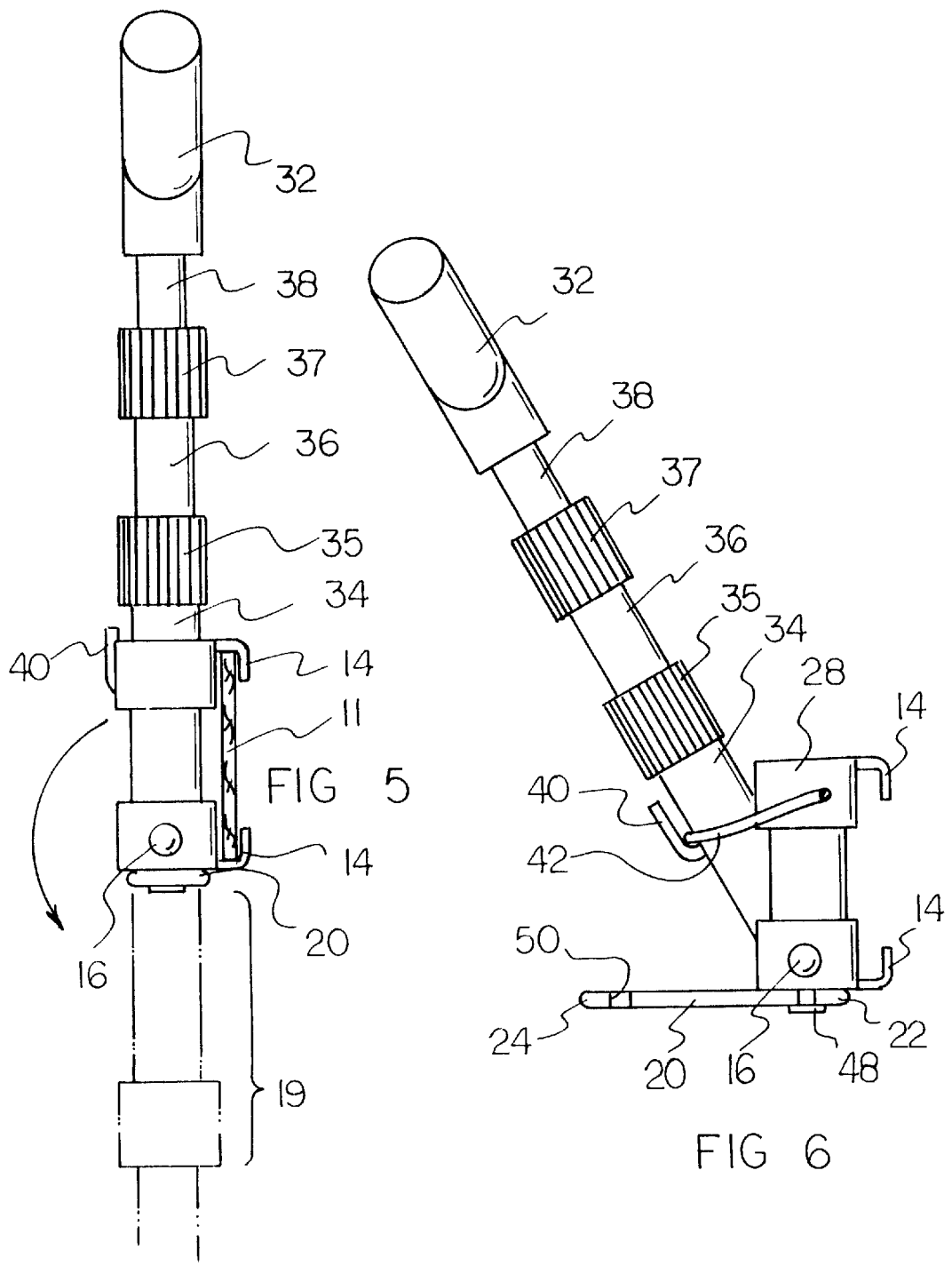

ARM STABILIZER APPARATUS

CROSS-REFERENCE TO RELATED APPLICATION

This application claims priority based upon my copending Provisional Application Ser. No. 60/043,449, filed Apr. 9, 1997.

BACKGROUND OF THE INVENTION

FIELD OF THE INVENTION

The present invention relates generally to devices for stabilizing a weapon that is aimed and, more particularly, to a device especially adapted for stabilizing an arm of a user who is aiming a weapon.

DESCRIPTION OF THE PRIOR ART

Devices are well known in the art for stabilizing the arm of a person who is aiming a weapon. In this respect, throughout the years, a number of innovations have been developed relating to such devices, and the following U.S. Pat. Nos. are representative of some of those innovations: 167,169; 915,481; 3,390,477; 4,844,390; and 5,528,846. With respect to the above-cited patents, it is noted that there are extensive teachings as to the orientation of the respective devices when the respective devices are in use for aiming a weapon. However, in an outdoor environment where hunting takes place, there are extended periods of time when the weapon is not being aimed. For example, as the hunter treks through the woods, before game is seen, the weapon is not being aimed. In this respect, it would be desirable if an arm stabilizer for aiming a weapon were provided that is conveniently and easily placed in a non-use orientation. Of course, once game is spotted, it would be desirable for an arm stabilizer to be easily shifted from a non-use orientation to the in-use orientation.

With a belt-worn arm stabilizer, it would be further desirable if more than one non-use orientation were provided. More specifically, without detaching the arm stabilizer from the wearer's belt, it would be desirable if one non-use orientation could be above the belt, and another non-use orientation could be below the belt.

Still other features would be desirable in an arm stabilizer apparatus. For example, it would be desirable if the arm stabilizer apparatus could be adjustable for a wide range of sizes of the wearers. Also, once a desired in-use orientation is obtained, it would be desirable if the arm stabilizer apparatus would return to the desired in-use orientation after having been previously placed in a non-use orientation.

Thus, while the foregoing body of prior art indicates it to be well known to use arm stabilizers for aiming a weapon, the prior art described above does not teach or suggest an arm stabilizer apparatus which has the following combination of desirable features: (1) is conveniently and easily placed in a non-use orientation; (2) is easily shifted from a non-use orientation to the in-use orientation; (3) provides more than one non-use orientation; (4) provides one non-use orientation which is above the belt and provides another non-use orientation which is below the belt; (5) can be adjusted for a wide range of sizes of the wearers; and (6) returns to the desired in-use orientation after having been previously placed in a non-use orientation. The foregoing desired characteristics are provided by the unique arm stabilizer apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an arm stabilizer apparatus which is attachable to a belt and includes a base assembly which includes belt connectors for connecting the base assembly to the belt. A hinge is connected to the base assembly, and an adjustable-length arm stabilizer assembly is connected to the hinge. When the base assembly is connected to a belt, the adjustable-length arm stabilizer assembly is pivoted on the hinge and is oriented in an arm-reception orientation, whereby a portion of a person's upper arm can be supported by the adjustable-length arm stabilizer assembly for aiming a weapon, such as a rifle or bow. The belt connectors are in the form of brackets which engage the belt. The base assembly and the belt connectors are formed as a unified structure.

The base assembly can include a base plate which has a first plate end and a second plate end. A first base column is connected to the first plate end, and a second base column is connected to the second plate end. The first base column is spaced apart from the second base column a sufficient distance to permit portions of the adjustable-length arm stabilizer assembly to be positioned between the first base column and the second base column when the adjustable-length arm stabilizer assembly is not in-use for supporting the person's forearm. The hinge includes a hinge pin is connected between the first base column and the second base column.

The first base column includes a bottom pivot depending downward from the first base column. The base plate includes a pivot channel pivotally connected to the bottom pivot. The second base column includes a bottom lock pin depending downward from the second base column, and the base plate includes a locking slot for selectively engaging the bottom lock pin.

The adjustable-length arm stabilizer assembly is pivotally connected to the hinge pin. The adjustable-length arm stabilizer assembly includes a telescopic strut assembly pivotally connected to the hinge pin and includes a forearm receiver connected to the telescopic strut assembly. The telescopic strut assembly includes a first strut member pivotally connected to the hinge pin. A second strut member is telescopically received by the first strut member. A third strut member is telescopically received by the second strut member. The forearm receiver is connected to the third strut member. The first strut member includes a first lock nut, and the second strut member includes a second lock nut.

A strut orientation control assembly is connected between the adjustable-length arm stabilizer assembly and the belt. The strut orientation control assembly can include a flexible line connected to the belt. A guide hook is connected to the adjustable-length arm stabilizer assembly, for receiving a portion of the flexible line.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved arm stabilizer apparatus which has all of the advantages of the prior art and none of the disadvantages.

It is another object of the present invention to provide a new and improved arm stabilizer apparatus which may be easily and efficiently manufactured and marketed.

It is a further object of the present invention to provide a new and improved arm stabilizer apparatus which is of durable and reliable construction.

An even further object of the present invention is to provide a new and improved arm stabilizer apparatus which is susceptible of a low cost of manufacture with regard to both materials and labor, and which accordingly is then susceptible of low prices of sale to the consuming public, thereby making such arm stabilizer apparatus available to the buying public.

Still yet a further object of the present invention is to provide a new and improved arm stabilizer apparatus which is conveniently and easily placed in a non-use orientation.

Still another object of the present invention is to provide a new and improved arm stabilizer apparatus that is easily shifted from a non-use orientation to the in-use orientation.

Yet another object of the present invention is to provide a new and improved arm stabilizer apparatus which provides more than one non-use orientation.

Even another object of the present invention is to provide a new and improved arm stabilizer apparatus that provides one non-use orientation which is above the belt and provides another non-use orientation which is below the belt.

An even further object of the present invention is to provide a new and improved arm stabilizer apparatus which can be adjusted for a wide range of sizes of the wearers.

Yet another object of the present invention is to provide a new and improved arm stabilizer apparatus that returns to the desired in-use orientation after having been previously placed in a non-use orientation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a side view of the embodiment of the invention shown in FIG. 3 taken along line 5—5 thereof.

FIG. 6 is a side view of the embodiment of the invention shown in FIG. 5 in an arm-reception mode and removed from the belt.

DESCRIPTION OF THE PREFERRED EMBODIMENT

With reference to the drawings, a new and improved arm stabilizer apparatus embodying the principles and concepts of the present invention will be described.

Figure 1:
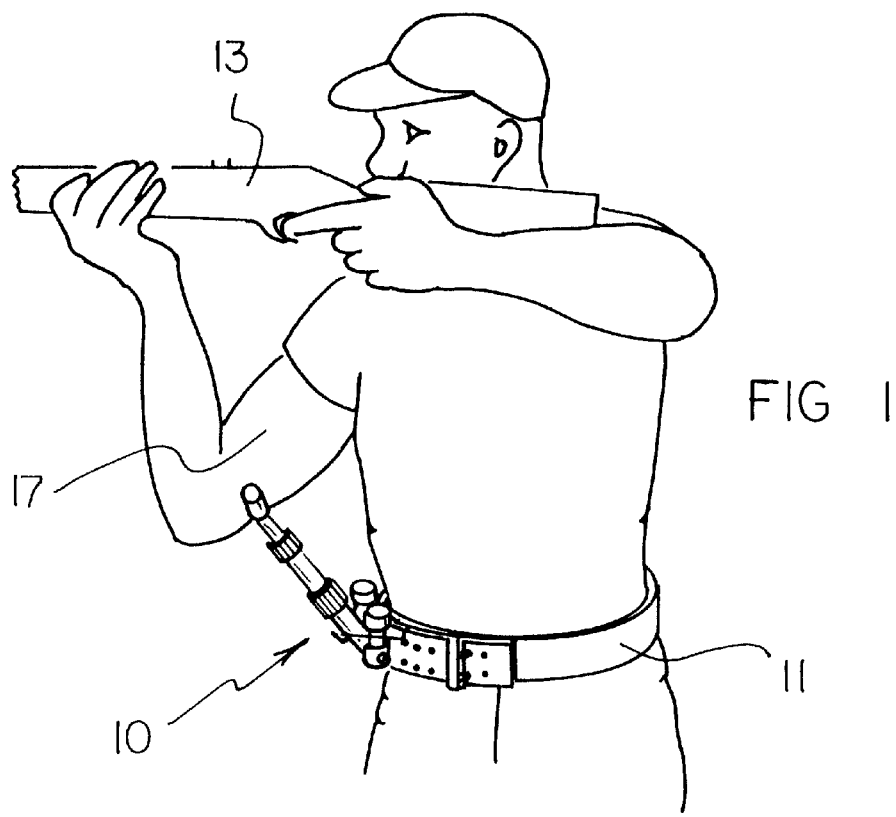
FIG. 1 is a perspective view showing a preferred embodiment of the arm stabilizer apparatus of the invention, attached to a belt, in an in-use, arm-reception orientation being used to stabilize a person's arm supporting a rifle that is being aimed.
Figure 2:
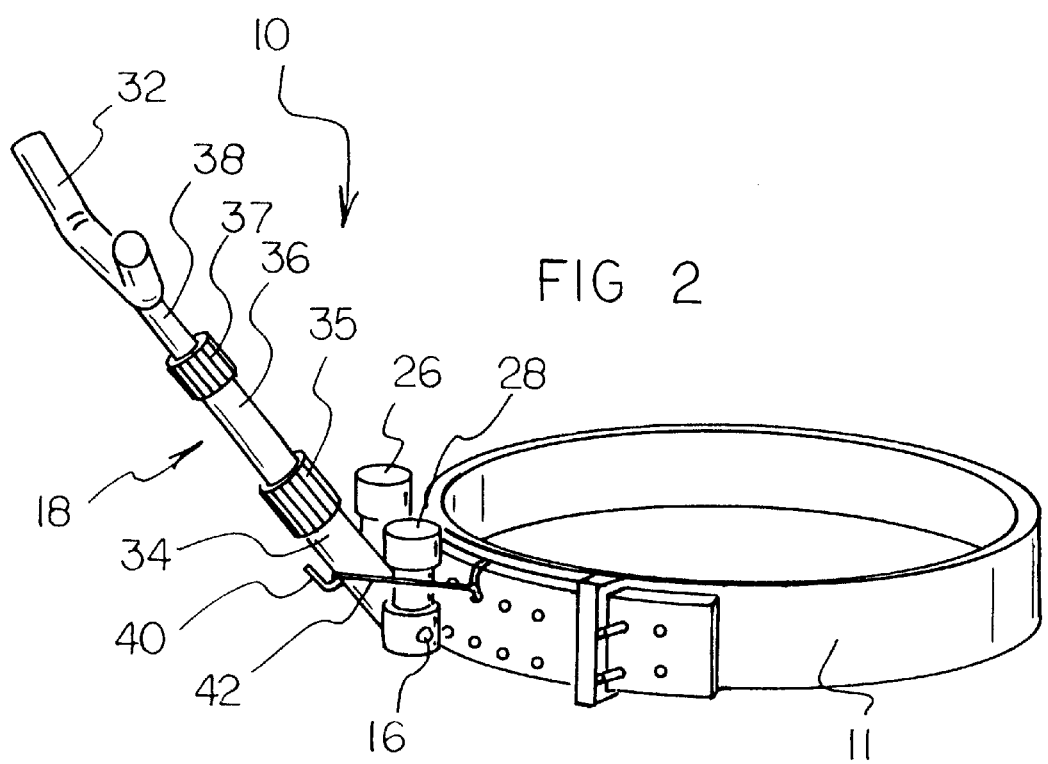
FIG. 2 is an enlarged perspective view of the embodiment of the arm stabilizer apparatus shown in FIG. 1 removed from the person and still attached to a belt and still in the arm-reception orientation.
Figure 3:
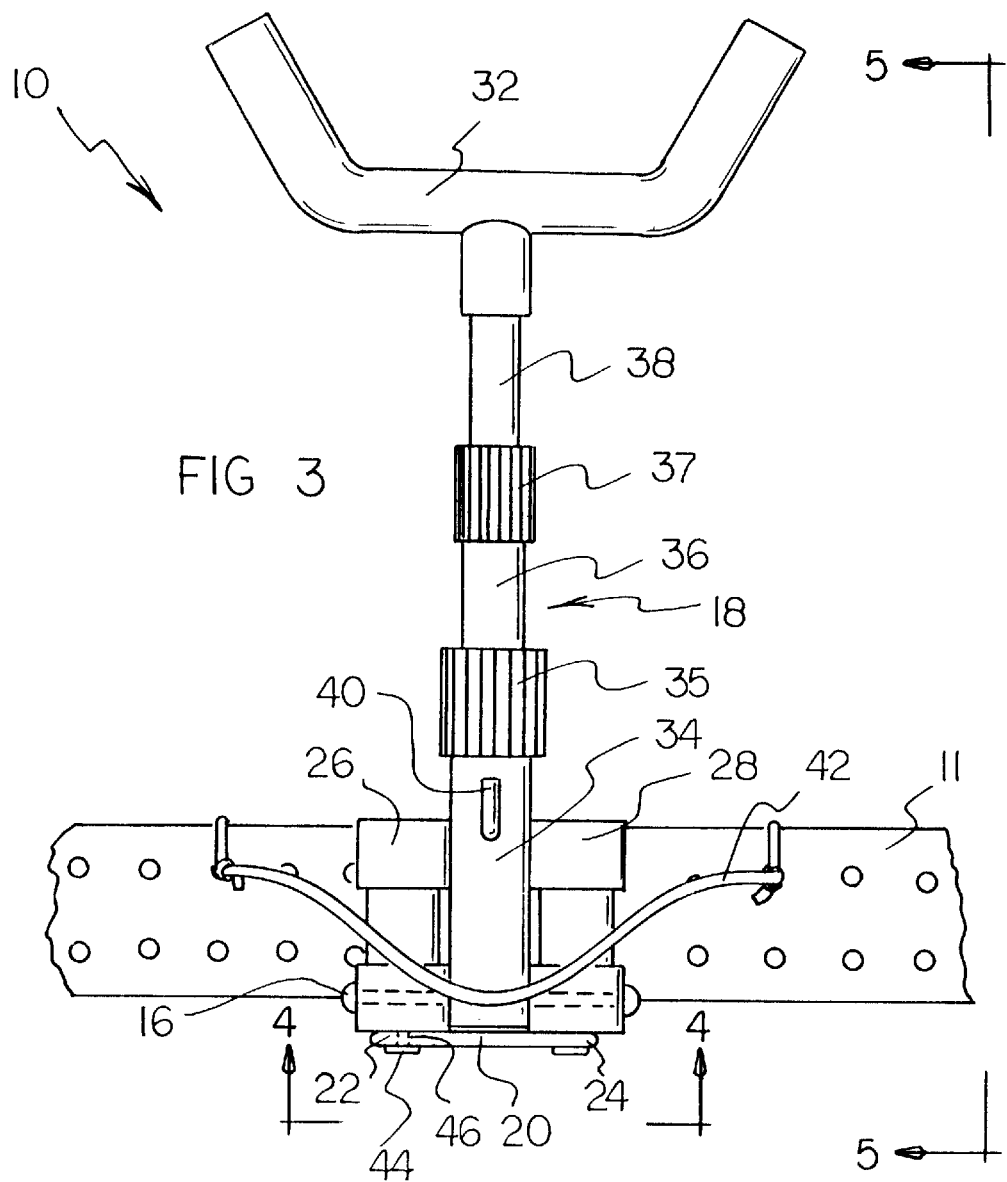
FIG. 3 is an enlarged front view of the embodiment of the invention shown in FIG. 2 with the arm stabilizer apparatus in an upwardly-standing, out-of-use orientation.
Figure 4:
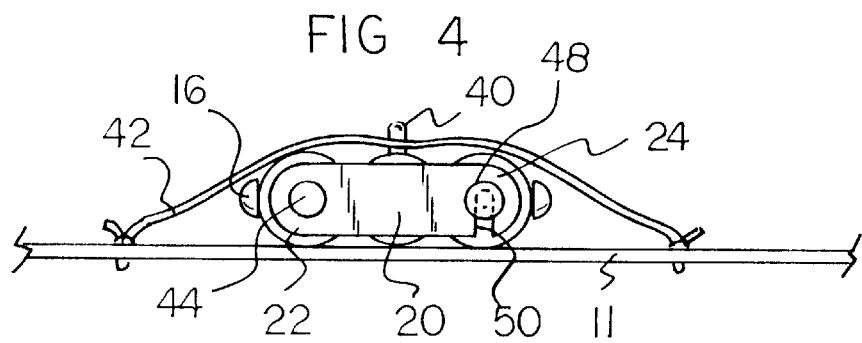
FIG. 4 is a bottom view of the embodiment of the invention shown in FIG. 3 taken along line 4—4 thereof.

Turning to FIGS. 1–6, there is shown an exemplary embodiment of the arm stabilizer apparatus of the invention generally designated by reference numeral 10. In its preferred form, an arm stabilizer apparatus 10 is attachable to a belt 11 and includes a base assembly which includes belt connectors for connecting the base assembly to the belt 11. A hinge is connected to the base assembly, and an adjustable-length arm stabilizer assembly 18 is connected to the hinge. When the base assembly is connected to a belt 11, the adjustable-length arm stabilizer assembly 18 is pivoted on the hinge and is oriented in an armreception orientation, whereby a portion of a person's upper arm can be supported by the adjustable-length arm stabilizer assembly 18 for aiming a weapon, such as a rifle 13 or bow. The belt connectors are in the form of brackets 14 which engage the belt 11. The base assembly and the belt connectors are formed as a unified structure.

The base assembly includes a base plate 20 which has a first plate end 22 and a second plate end 24. A first base column 26 is connected to the first plate end 22, and a second base column 28 is connected to the second plate end 24. The first base column 26 is spaced apart from the second base column 28 a sufficient distance to permit portions of the adjustable-length arm stabilizer assembly 18 to be positioned between the first base column 26 and the second base column 28 when the adjustable-length arm stabilizer assembly 18 is not in-use for supporting the person's forearm 17. The hinge includes a hinge pin 16 is connected between the first base column 26 and the second base column 28.

The first base column 26 includes a bottom pivot 44 depending downward from the first base column 26. The base plate 20 includes a pivot channel 46 pivotally connected to the bottom pivot 44. The second base column 28 includes a bottom lock pin 48 depending downward from the second base column 28, and the base plate 20 includes a locking slot 50 for selectively engaging the bottom lock pin 48.

The adjustable-length arm stabilizer assembly 18 is pivotally connected to the hinge pin 16. The adjustable-length arm stabilizer assembly 18 includes a telescopic strut assembly pivotally connected to the hinge pin 16 and includes a forearm receiver 32 connected to the telescopic strut assembly. The telescopic strut assembly includes a first strut member 34 pivotally connected to the hinge pin 16. A second strut member 36 is telescopically received by the first strut member 34. A third strut member 38 is telescopically received by the second strut member 36. The forearm receiver 32 is connected to the third strut member 38. The first strut member 34 includes a first lock nut 35, and the second strut member 36 includes a second lock nut 37.

A strut orientation control assembly is connected between the adjustable-length arm stabilizer assembly 18 and the belt 11. The strut orientation control assembly can include a flexible line 42 connected to the belt 11. A guide hook 40 is connected to the adjustable-length arm stabilizer assembly 18, for receiving a portion of the flexible line 42.

The arm stabilizer apparatus 10 of the invention can be oriented in three modes of orientation, one of which is an in-use orientation mode and two of which are out-of-use orientation modes. The in-use orientation mode is depicted most specifically in FIGS. 1, 2, and 6. In the in-use orientation mode, the arm stabilizer apparatus 10 is used for stabilizing a person's forearm 17 when the person is aiming a weapon, such as rifle 13. More specifically, the brackets 14 are employed to connect the arm stabilizer apparatus 10 to the belt 11. The adjustable-length arm stabilizer assembly 18 is pivoted on the hinge pin 16 so that the forearm receiver 32 is positioned under the forearm 17.

The flexible line 42 is used to maintain the adjustable-length arm stabilizer assembly 18 in this first mode of orientation. More specifically, two ends of the flexible line 42 are tied to the belt 11 in positions on the belt 11 that straddle the adjustable-length arm stabilizer assembly 18. The flexible line 42 is tightened so that the tension in the flexible line 42 maintains the adjustable-length arm stabilizer assembly 18 in the first orientation mode. The guide hook 40 prevents the flexible line 42 from slipping too far downward on the adjustable-length arm stabilizer assembly 18, so that the flexible line 42 is prevented from losing its desired tension on the adjustable-length arm stabilizer assembly 18.

The distance of the forearm receiver 32 from the hinge pin 16 is controlled by adjusting the first strut member 34, the second strut member 36, and the third strut member 38. The first lock nut 35 is used to secure a selected adjustment length of the second strut member 36 with respect to the first strut member 34. The second lock nut 37 is used to secure a selected adjustment length between the third strut member 38 and the second strut member 36.

When the arm stabilizer apparatus 10 is not used for stabilizing a person's forearm 17, the adjustable-length arm stabilizer assembly 18 can be rotated around the hinge pin 16 to one of two alternate out-of-use orientation modes. In a first 10 out-of-use orientation mode, as shown most specifically in FIGS. 3, 4, and 5, the adjustable-length arm stabilizer assembly 18 is rotated around the hinge pin 16 so that the adjustable-length arm stabilizer assembly 18 is positioned above the belt 11. In this out-of-use orientation mode, the flexible line 42 need not be loosened or disconnected from the belt 11.

A second out-of-use orientation mode is depicted in broken lines in FIG. 5. In this mode, shown with bracket 19, the adjustable-length arm stabilizer assembly 18 is oriented below the belt 11. To achieve this out-of-use orientation mode, the flexible line 42 must be loosened, or one end of the flexible line 42 is disconnected from the belt 11.

It is noted that, in order to facilitate this orientation of the adjustable-length arm stabilizer assembly 18, the locking slot 50 in the base plate 20 is disengaged from the bottom lock pin 48, and the base plate 20 is rotated around the bottom pivot 44 so that the base plate 20 does not obstruct movement of the adjustable-length arm stabilizer assembly 18 around the hinge pin 16. This is shown most clearly in FIG. 6. Once the base plate 20 does not obstruct movement of the adjustable-length arm stabilizer assembly 18, the adjustable-length arm stabilizer assembly 18 can be rotated to the orientation shown in the bracketed region 19 shown in FIG. 5.

When the arm stabilizer apparatus 10 is no longer to be worn by the person, the brackets 14 are disconnected from the belt 11, and the arm stabilizer apparatus 10 is removed from is supported by the belt 11.

The components of the arm stabilizer apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved arm stabilizer apparatus that is low in cost, relatively simple in design and operation, and which may be conveniently and easily placed in a non-use orientation. With the invention, an arm stabilizer apparatus is provided which is easily shifted from a non-use orientation to the in-use orientation. With the invention, an arm stabilizer apparatus provides more than one non-use orientation. With the invention, an arm stabilizer apparatus provides one non-use orientation which is above the belt and provides another non-use orientation which is below the belt. With the invention, an arm stabilizer apparatus is provided which can be adjusted for a wide range of sizes of the wearers. With the invention, an arm stabilizer apparatus is provided which returns to the desired in-use orientation after having been previously placed in a non-use orientation.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An arm stabilizer apparatus attachable to a belt, comprising:

a base assembly, belt connector means, attached to said base assembly, for connecting said base assembly to the belt, a hinge connected to said base assembly, and an adjustable-length arm stabilizer assembly connected to said hinge, wherein said base assembly includes:

a base plate having a first plate end and a second plate end, a first base column connected to said first plate end, and a second base column connected to said second plate end, and wherein said first base column includes a bottom pivot depending downward from said first base column and wherein said base plate includes a pivot channel pivotally connected to said bottom pivot.

2. The apparatus of claim 1 wherein said belt connector means are in the form of brackets which engage the belt.

3. The apparatus of claim 1 wherein said base assembly and said belt connector means are formed as a unified structure.

4. The apparatus of claim 1 wherein said first base column is spaced apart from said second base column a sufficient position to permit portions of said adjustable-length arm stabilizer assembly to be positioned between the first base column and the second base column.

5. The apparatus of claim 1 wherein said hinge includes a hinge pin connected between said first base column and said second base column.

6. The apparatus of claim 1 wherein said second base column includes a bottom lock pin depending downward from said second base column, and wherein said base plate includes a locking slot for selectively engaging said bottom lock pin.

7. The apparatus of claim 5, wherein said adjustable-length arm stabilizer assembly is pivotally connected to said hinge pin.

8. The apparatus of claim 7 wherein said adjustable-length arm stabilizer assembly includes a telescopic strut assembly pivotally connected to said hinge pin and a forearm receiver connected to said telescopic strut assembly.

9. The apparatus of claim 8 wherein said telescopic strut assembly includes:

a first strut member pivotally connected to said hinge pin, a second strut member telescopically received by said first strut member, and a third strut member telescopically received by said second strut member, wherein said forearm receiver is connected to said third strut member.

10. The apparatus of claim 9 wherein:

said first strut member includes a first lock nut, and said second strut member includes a second lock nut.

11. An arm stabilizer apparatus attachable to a belt, comprising:

a base assembly, belt connector means, attached to said base assembly, for connecting said base assembly to the belt, a hinge connected to said base assembly, and an adjustable-length arm stabilizer assembly connected to said hinge, a strut orientation control assembly connected between said adjustable-length arm stabilizer assembly and the belt, and wherein said strut orientation control assembly includes a flexible line connected to the belt, said apparatus further including:

a guide hook, said guide hook being connected to said adjustable-length arm stabilizer assembly for receiving a portion of said flexible line.

* * * * *